Mar. 27, 1923.
J. B. OLSON
STOCK WATERING BUCKET
Filed July 2, 1917
1,449,693
2 sheets-sheet 1
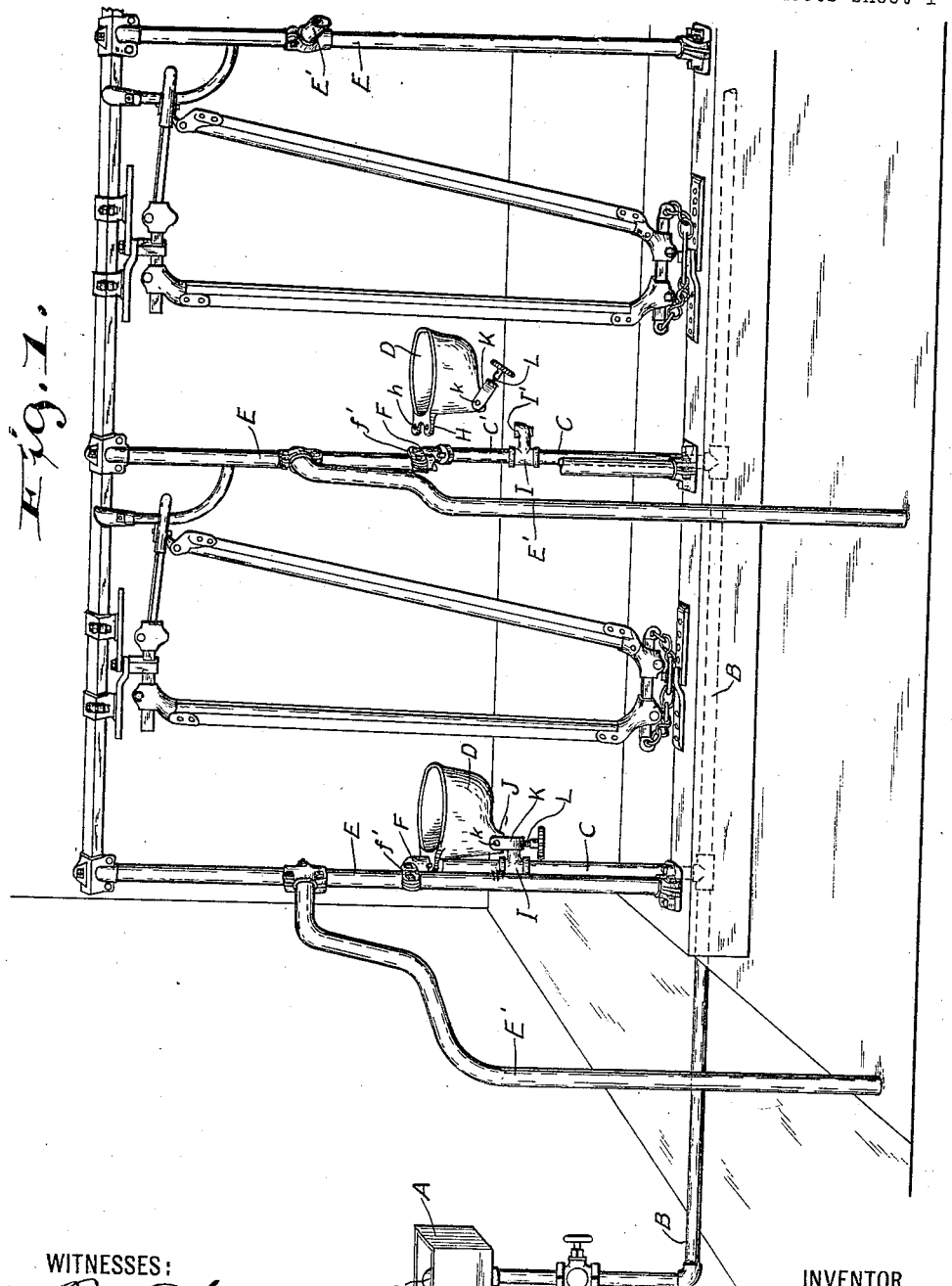
WITNESSES:
INVENTOR
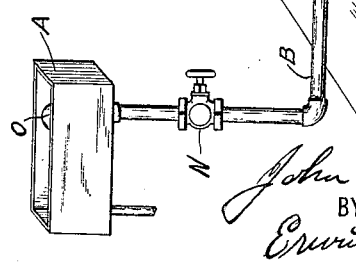
BY
ATTORNEYS Mar. 27, 1923.  1,449,693
J. B. OLSON
STOCK WATERING BUCKET
Filed July 2, 1917    2 sheets-sheet 2
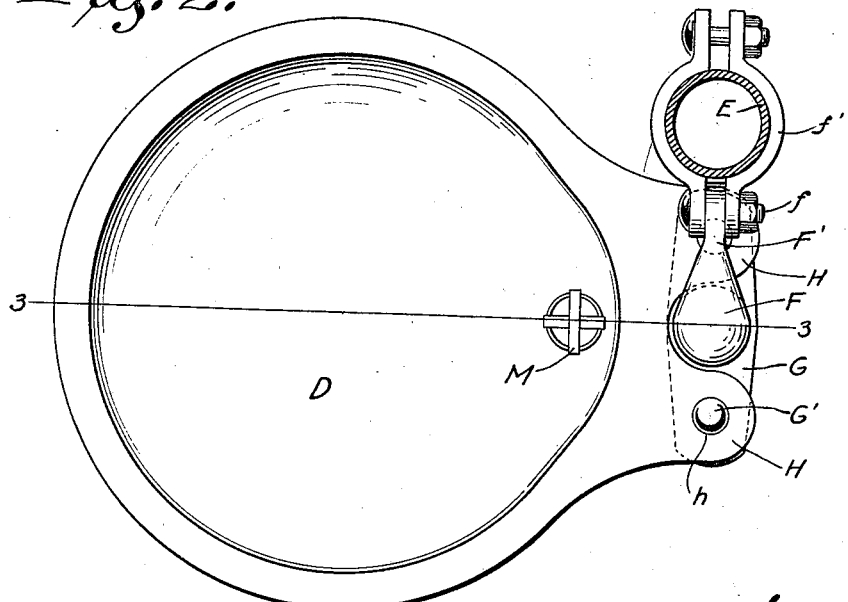
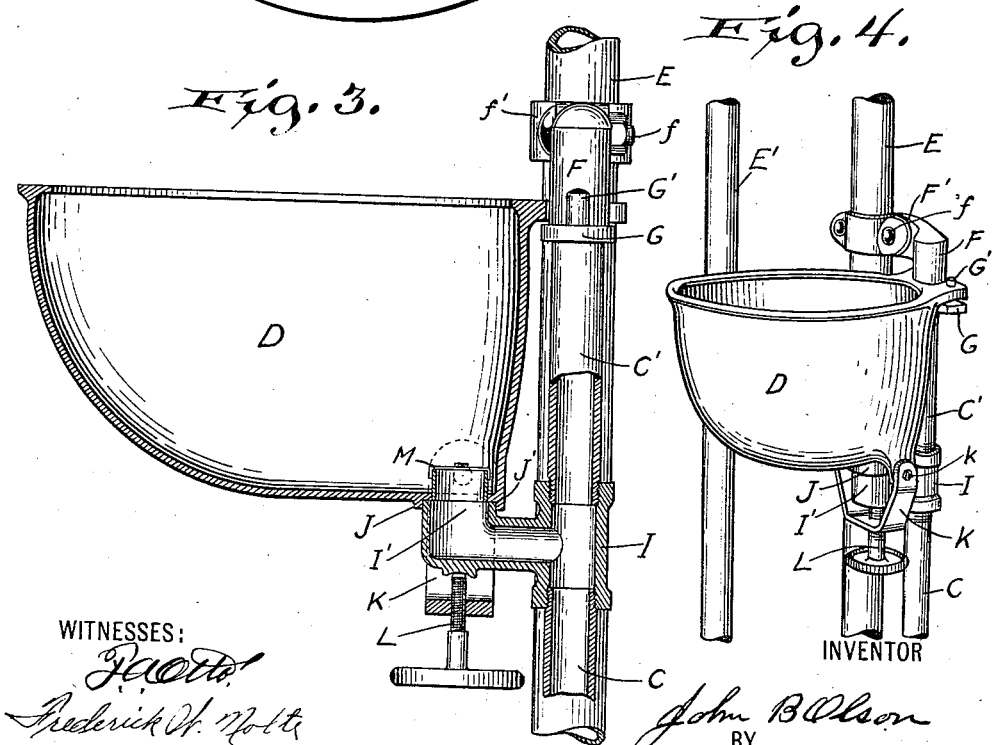
WITNESSES:
INVENTOR
John B Olson
BY
ATTORNEYS Patented Mar. 27, 1923.

1,449,693

UNITED STATES PATENT OFFICE.

JOHN B. OLSON, OF FORT ATKINSON, WISCONSIN, ASSIGNOR TO JAMES MANUFACTURING CO., OF FORT ATKINSON, WISCONSIN, A CORPORATION OF WISCONSIN.

STOCK-WATERING BUCKET.

Application filed July 2, 1917. Serial No. 178,142.

*To whom it may concern:*

Be it known that I, JOHN B. OLSON, a citizen of the United States, residing at Fort Atkinson, county of Jefferson, and State of Wisconsin, have invented new and useful Improvements in Stock-Watering Buckets, of which the following is a specification.

My invention relates to improvements in stock watering devices of that type in which the delivery of water to the individual buckets is controlled by gravity.

Water supply systems for stock, as heretofore constructed, may be classed as pressure systems and gravity systems. In the pressure systems, each individual bucket contains a valve adapted to be operated by the nose of the animal to admit water to the cup. The bowls or buckets of these systems are quite easily cleaned owing to the fact that water may be admitted to the bowls under pressure to flush out accumulations of straw and sediment, but the valve mechanisms are expensive and frequently get out of order, in which event the valves often fail to close and the stable becomes flooded with water. Notwithstanding this fact, the pressure systems have frequently been installed owing to the fact that the buckets in the gravity systems, as heretofore constructed, are difficult to clean and usually become very dirty and unsanitary. In the operation of supplying water, however, the gravity system has always been recognized as the more practical, the water being supplied to the buckets thru valveless inlets, if desired, from a main supply tank in which the water level is maintained by a single float operated valve mechanism, the surface of the water in the supply tank being thus kept at the level at which the water is to be maintained in the buckets.

The object of the present invention is to overcome the objection to the gravity system for lack of proper sanitation by providing means whereby the individual buckets may be separately removed, cleaned, sterilized, and replaced. More particularly, the object of this invention is to provide a form of detachable bucket for a gravity water supply system for stock in which the bucket will be adequately supported when in use, quickly detached when it is desired to clean it, and as quickly replaced in water tight connection with the supply pipe to which the bucket is located, in such a manner that it cannot be disengaged by the animal.

Incidentally to the above objects, I propose to so locate my improved stock watering bucket that, when in position for use, it will perform the double function of a watering bucket and a portion of the stanchion frame adapted to prevent the animal from obtaining access to the manger at the side of the stanchion. Heretofore, it has been the practice to provide a special frame member or adjustable stop between the upright stanchion bar and the adjacent post of the stanchion frame. By my improvement, I dispense with this frame member or stop and utilize the bucket to perform the functions of such auxiliary frame member.

In the drawings:—

Figure 1 is an elevation of a gravity stock watering system embodying my invention, showing one of the buckets in position for use and another bucket disengaged.

Figure 2 is a detail plan view of one of the buckets, showing the adjacent stanchion post in cross section.

Figure 3 is a sectional view drawn on line 3—3 of Figure 2.

Figure 4 is a detail perspective view from the reverse side of one of the buckets in position for use, the water supply pipe and supporting frame post being broken away.

Like parts are identified by the same reference characters thruout the several views.

Water is supplied from a supply tank A thru a main B to a series of standpipes C with which the respective buckets D are connected. Each of these standpipes C its connected with one of the frame posts E of the stanchion frame to which the stall partitions E' are also connected. Any suitable means of connection may be employed for attaching the standpipes to the stanchion frame posts, but I preferably provide each standpipe C with a cap fitting F having a laterally projecting arm F' apertured to receive a bolt *f* which operates as one of the clamping bolts of a set of clamping members *f'* adapted to embrace the posts E. The cap fitting F is provided with a skirt flange G having upwardly projecting studs G', these studs being adapted to project thru holes *h* in a set of ears H, projecting from the upper margin of the bowl D on one side.

The standpipe is formed in sections C, C' connected by a ported fitting I adapted to form a seat at I' having a tubular stud or boss J on the bottom of the bucket, and near the side thereof occupied by the ears H. A clamping yoke K, pivoted to the bucket at *k, k*, is adapted to swing under the projecting arm of the fitting I and a set of screws L, threaded in this clamping yoke, are adapted to be turned upwardly against the under surface of the fitting I directly underneath the outlet I' thereof upon the wall of which the boss J is seated. The clamping set screw L may, therefore, be utilized to draw the bucket downwardly, causing the boss J to bind upon the seat at I', whereupon water may pass freely from the standpipe C thru the port in the fitting I upwardly into the bucket thru the tubular boss J, the passage thru said boss communicating with the interior of the bucket.

If desired, the boss may be extended for a short distance upwardly within the bucket as shown at J', and a guard M may, if desired, be seated upon its upper end. This guard, however, is not necessary, and when used, its principal function will be to prevent fragments of hay and straw from settling into the ducts or accumulating in the ports or passages thru the fittings I.

The arrangement is such that, when the tubular boss J is clamped to its seat at I', the ears H will be engaged with the studs G', the latter being entered in the apertures H in the ears, but by unscrewing the clamping set screw L sufficiently to allow the yoke K to swing from beneath the fitting I, the bucket D may be lifted vertically to not only disengage it from the seat at I', but also to remove it from the supporting studs G'. The bucket may then be inverted, cleaned by immersing it in hot water or other cleansing material, and replaced. If desired, a main valve at N may be manually closed to shut off the main supply tank when the buckets are being cleaned. The water level in the main supply tank will be maintained by means of ordinary float operated valve mechanism at O.

It will be observed that the stanchions illustrated in the drawings are of that type in which the swinging stanchion member and the slide at its upper end are interlocked with the stanchion frame when in open or normal receiving position, thus preventing the stanchion from rotating and, therefore, holding the opposing stanchion member in such relation to the bucket that the latter may serve as a stop to prevent the animal from obtaining access to the manger at the side of the stanchion occupied by the bucket, the movable stanchion member performing a similar function on the opposite side. By offsetting the bucket a short distance from the supporting hydrant, or water supply pipe, the space between the adjacent frame bar and the stanchion can be very effectually blocked.

I claim—

1. Stock watering apparatus including the combination with posts of a stanchion supporting frame, of a main supply tank, a set of standpipes connected therewith and having their upper ends supported from the posts of the stanchion frame, a set of brackets on said standpipes each provided with a plurality of upwardly extending projections, a set of buckets, one for each standpipe, and each having an apertured connecting member adapted to slide vertically into engagement with said projections at a plurality of points, a ported fitting connected with each standpipe and arranged to form a seat for the bucket connected with such standpipe, said buckets being each provided with a ported inlet adapted to seat upon said fitting, a swinging clamping yoke connected with each bucket and adapted to swing around the fitting which supports the bucket, and a clamping set screw carried by said yoke and adapted to engage the under side of the fitting, said set screws being adapted to draw the buckets downwardly upon the fittings to form water tight joints and to prevent disengagement of the apertured connecting members when said set screws are in clamping position.

2. Stock watering apparatus including the combination with posts of a stanchion supporting frame, of a main supply tank, a set of standpipes connected therewith and having their upper ends supported from the posts of the stanchion frame, a set of brackets on said standpipes each provided with a plurality of upwardly extending projections, a set of buckets, one for each standpipe, and each having an apertured connecting member adapted to slide vertically into engagement with said projections at a plurality of points, a ported fitting connected with each standpipe and arranged to form a seat for the bucket connected with such standpipe, said buckets being each provided with a ported inlet adapted to seat upon said fitting, a swinging clamping yoke connected with each bucket and adapted to swing around the fitting which supports the bucket, and a clamping set screw carried by said yoke and adapted to engage the under side of the fitting, said set screws being adapted to draw the buckets downwardly upon the fittings to form water tight joints and to prevent disengagement of the apertured connecting members when said set screws are in clamping position, said standpipes being adapted to support the buckets in front of the space between the stanchion frame post and an adjacent stanchion.

In testimony whereof I affix my signature in the presence of two witnesses.

JOHN B. OLSON.

Witnesses:
JOHN A. KEMMETER,
ROBT. J. PARKS.